(No Model.) 6 Sheets—Sheet 1.
O. LUGO.
ELECTRIC MOTOR AND DYNAMO MACHINE.
No. 385,675. Patented July 3, 1888.
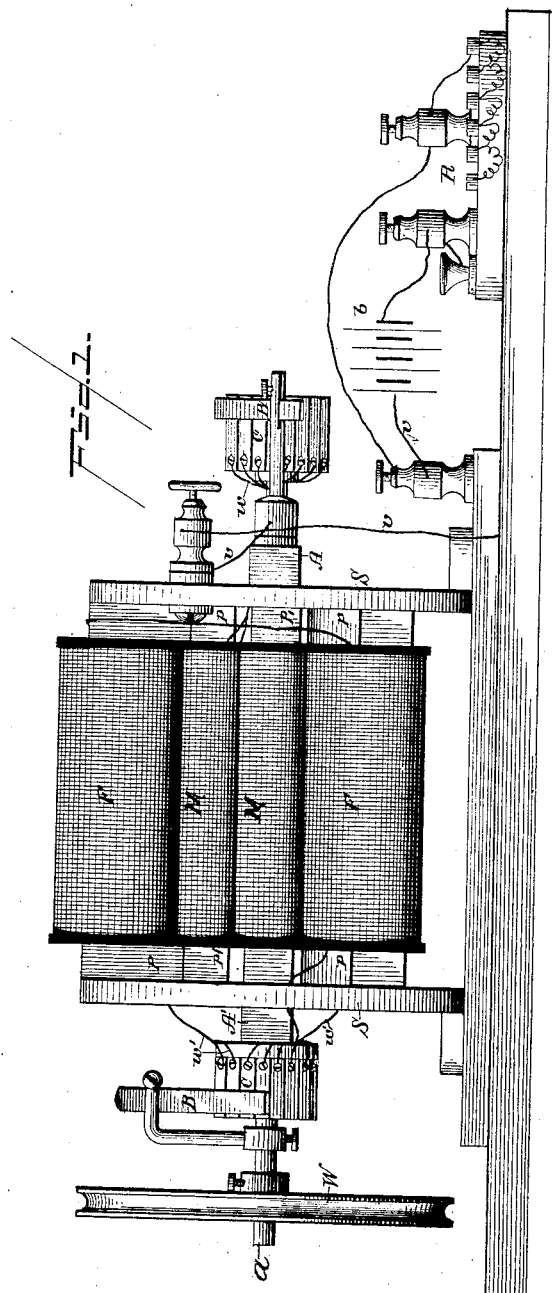
WITNESSES.
INVENTOR,
Orazio Lugo.

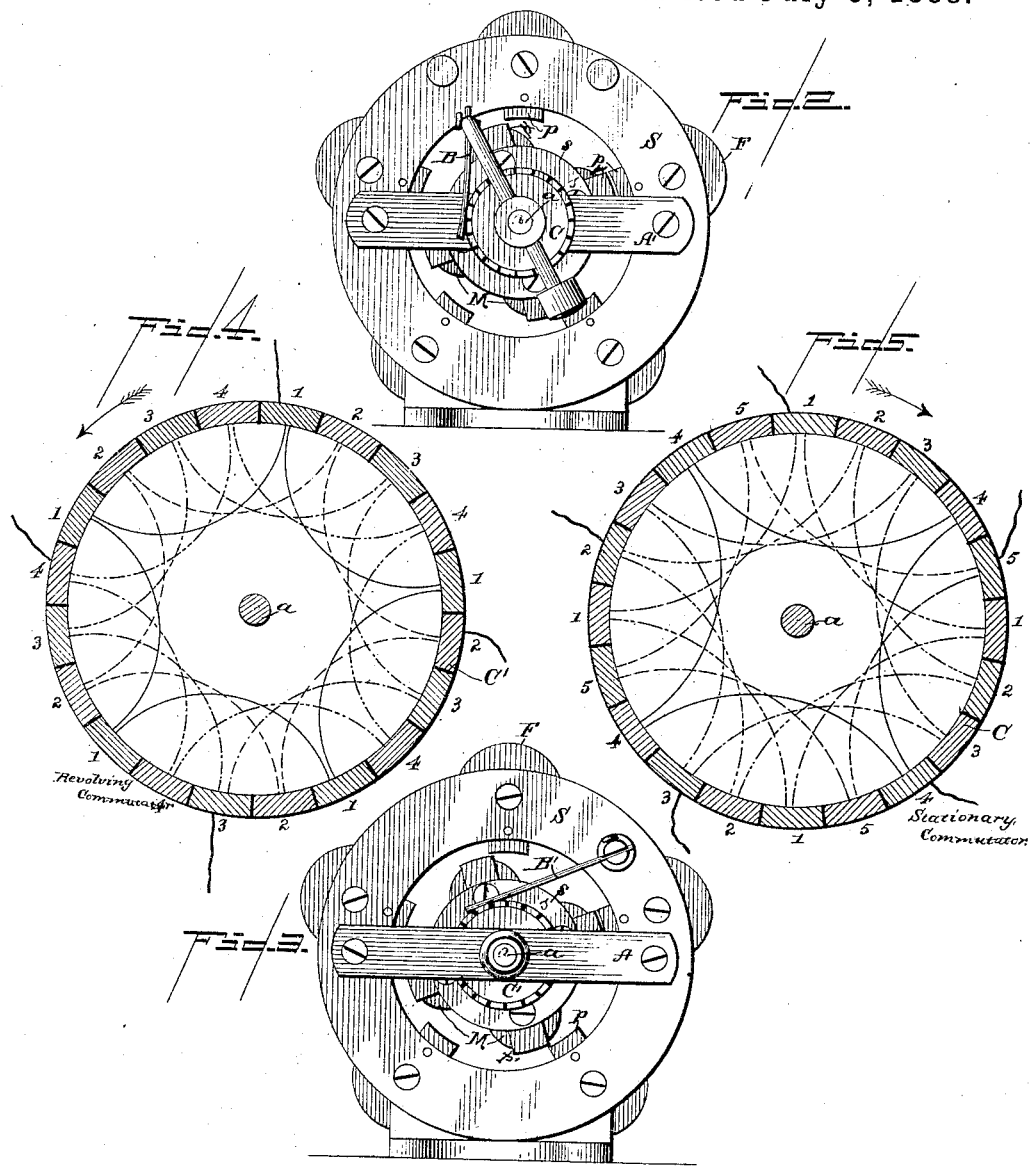

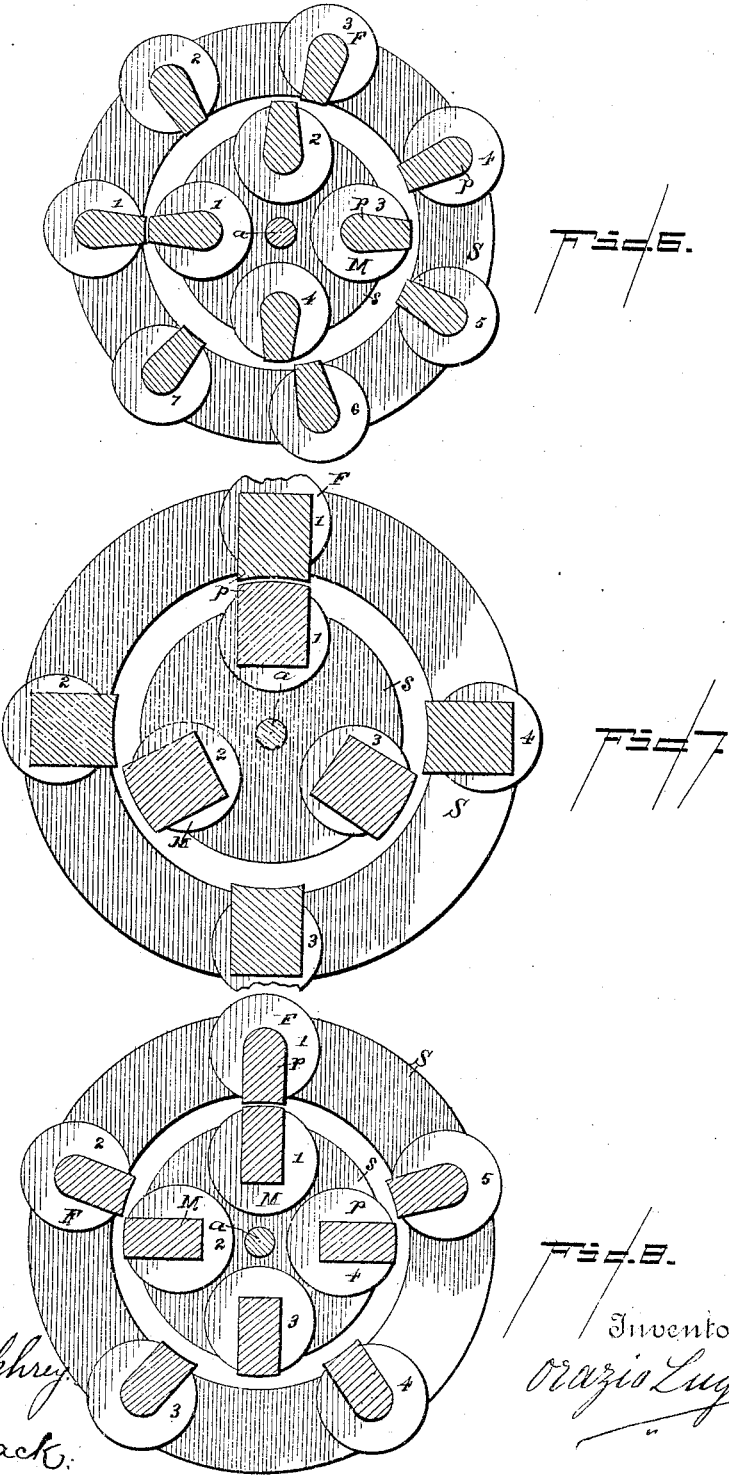
(No Model.) 6 Sheets—Sheet 3.
O. LUGO.
ELECTRIC MOTOR AND DYNAMO MACHINE.
No. 385,675. Patented July 3, 1888.

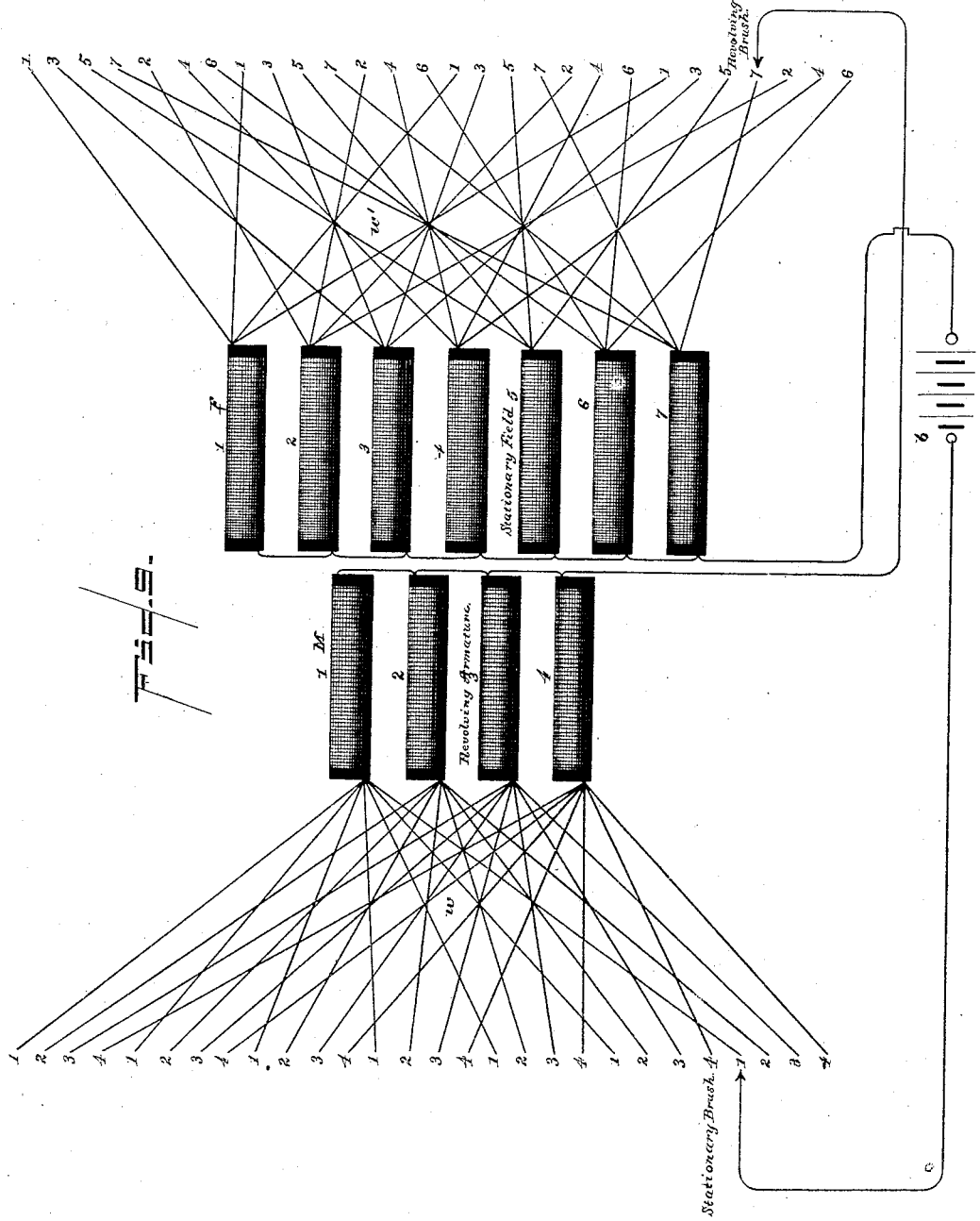

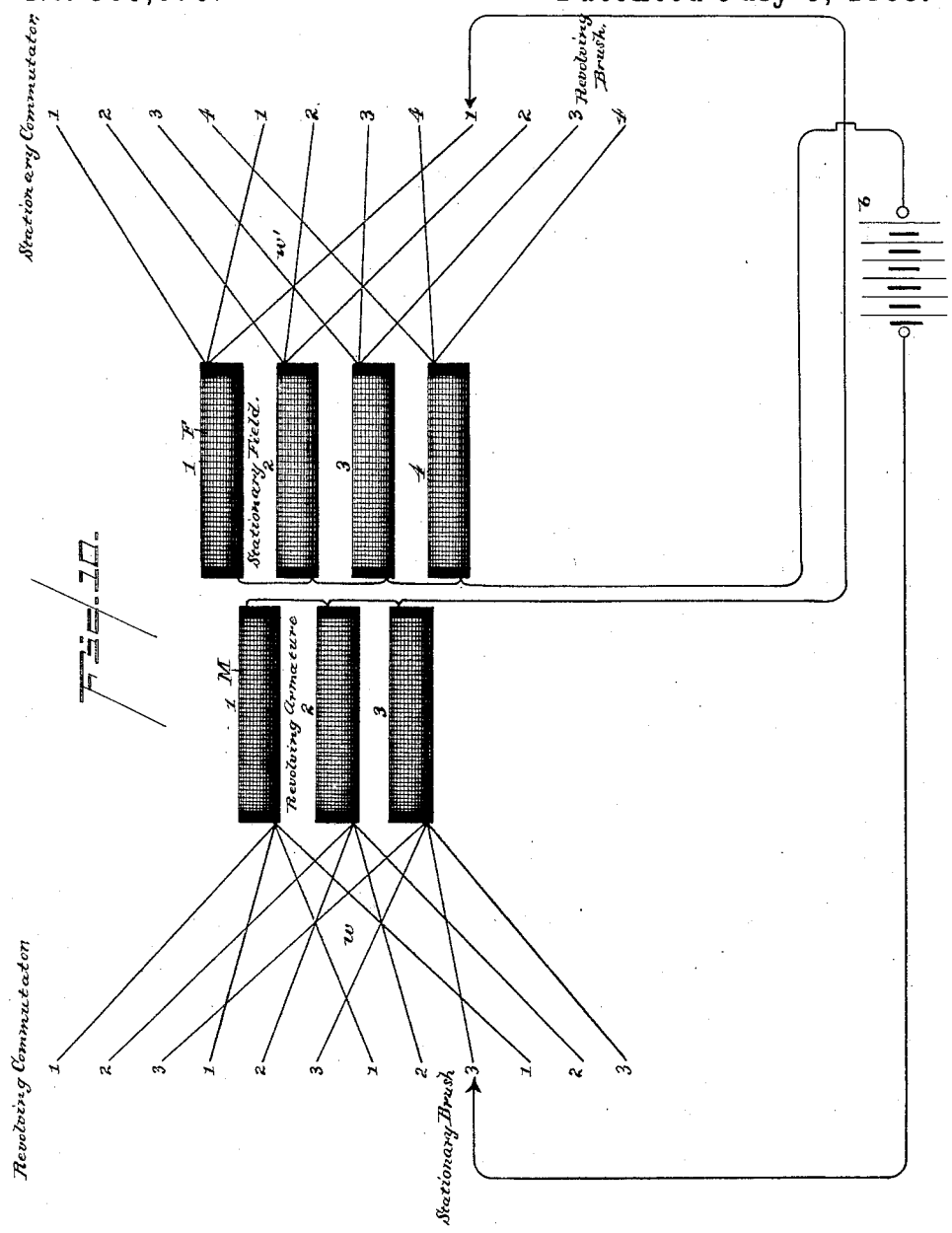

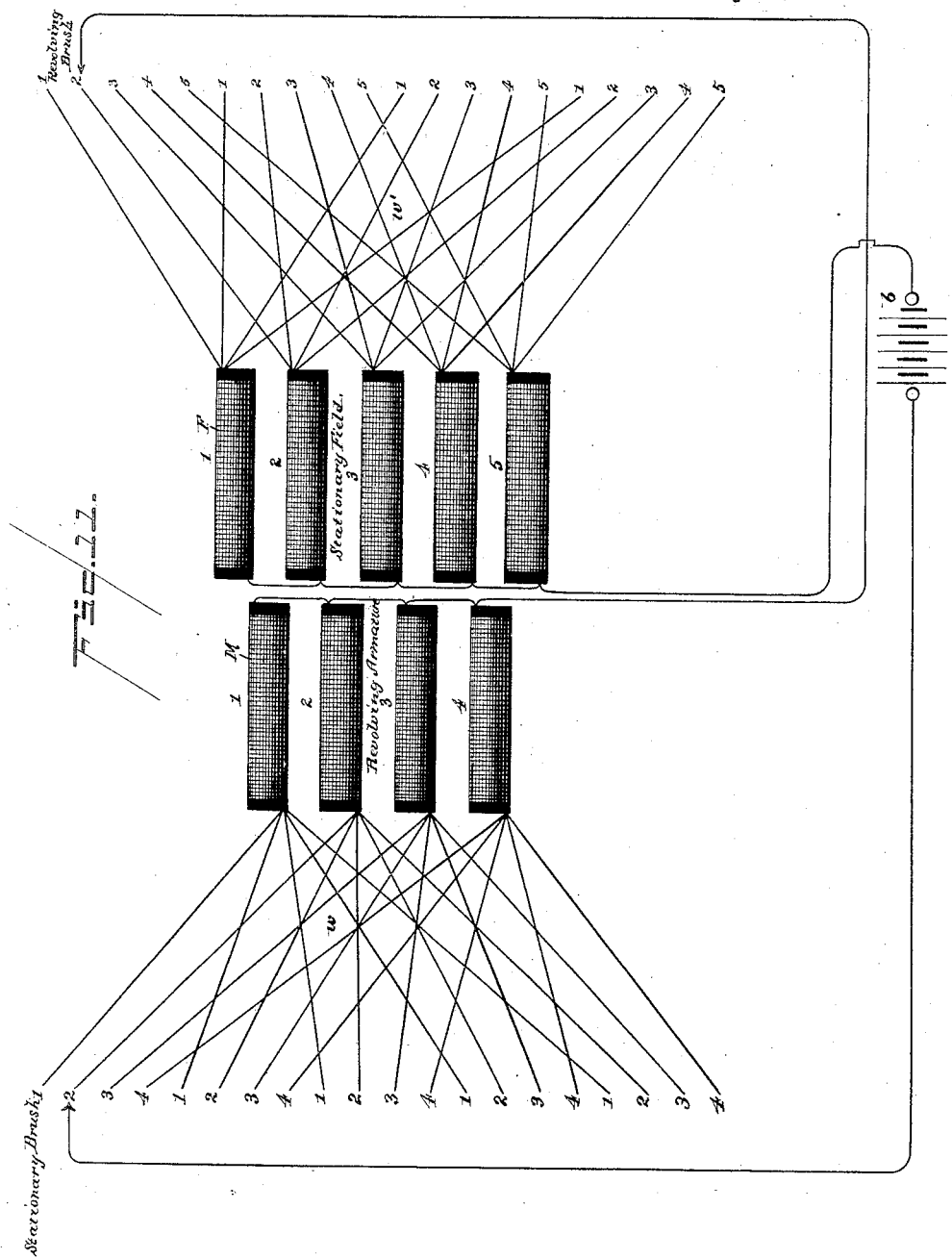

UNITED STATES PATENT OFFICE.

ORAZIO LUGO, OF NEW YORK, N. Y.

ELECTRIC MOTOR AND DYNAMO-MACHINE.

SPECIFICATION forming part of Letters Patent No. 385,675, dated July 3, 1888.

Application filed May 1, 1888. Serial No. 272,399. (No model.)

*To all whom it may concern:*

Be it known that I, ORAZIO LUGO, a citizen of the United States, of the city, county, and State of New York, have invented certain new and useful Improvements in Electric Motors and Dynamo-Machines, of which the following is a specification.

My invention relates to a method and improvements in converting electrical energy into mechanical force, and in producing electricity by motive power, which consists in actuating a plurality of electro-magnets placed in circuit in such a manner that one electro-magnet forms the complete armature of another electro-magnet several times during one revolution of the revolving electro-magnets with the stationary electro-magnets; and my invention further consists in connecting one end of each stationary electro-magnet coil in multiple arc with other similar ends and dividing the other end of the same coil and connecting it to several segments of a stationary commutator provided with a revolving brush; and my invention still further consists in connecting one end of each revolving electro-magnet coil in multiple arc with other similar ends and dividing the opposite end of the same coil and connecting it to several segments of a revolving commutator provided with a stationary brush, by means of which only one segment of each commutator is in contact with its connectors at one time, thus forming a metallic circuit only through two electro-magnets (one stationary and one revolving) at a time, and when the electric current is passing through the helices of the two electro-magnets and their opposite poles are almost in front of each other or entering the stronger field of force, obtaining either motion from electricity or generating a current by the application of mechanical energy to the machine, as hereinafter described and claimed. I attain these objects by the organization illustrated in the accompanying drawings and diagrams, in which—

Figure 1 is a side elevation of the machine; Fig. 2, an end view; Fig. 3, a view of the other end. Fig. 4 represents the revolving commutator with one end of each coil of the revolving electro-magnets connected to several corresponding segments of the commutator. Fig. 5 represents the stationary commutator with one end of each coil of the stationary field electro-magnets connected to several corresponding segments of the commutator. Figs. 6, 7, and 8 are vertical sections of the machine as it appears after removal of the commutator-brush and cross-bar, each view showing a different number of electro-magnet combinations. Fig. 11 is a diagram showing the theoretical connections of the combination represented in Figs. 1, 2, 3, and 8. Figs. 9 and 10 are diagrams with connections of combinations represented in Figs. 6 and 7.

Similar letters and numbers refer to similar parts throughout the several views.

F F are stationary electro-magnets, having elongated pole-pieces $p\,p$, fastened to standards or supports S S', made of brass or other diamagnetic metal, in order magnetically to insulate their polar ends.

M M are revolving electro-magnets, having elongated pole-pieces $p'$, fastened to brass plates $s\,s'$, said brass plates being made fast to the shaft $a$, to which is also fastened the revolving commutator, the segments or plates of which are insulated from the shaft.

A A' are brass cross-bars forming the bearing for the shaft.

C is a stationary commutator fastened to the brass cross-bar A', and insulated from it and the shaft $a$.

B is the revolving brush, the arm of which is in metallic connection with the shaft $a$, and B' is the stationary brush, the arm of which is insulated from the rest of the machine, but connected by wire V to one pole of the battery $b$ (when the machine is used as a motor.) W W are insulated wires coming through the shaft, connecting one end of the coils of the revolving electro-magnets M with the revolving commutator-segments, as shown in diagram in Fig. 4. $w'\,w'$ are insulated wires connecting one end of the coils of the stationary electro-magnets F with the stationary commutator-segments, as shown in diagram at Fig. 5. $b$ represents an electrical generator, and R a rheostat.

In order to better describe the operation which takes place when the machine is used as a motor, I will refer to Figs. 1, 4, 5, 8, and 11, as follows: The current enters from battery $b$, Fig. 1, through wire $v$, passes to stationary brush B', revolving commutator-segment 1, Figs. 4 and 11, wire $w$, revolving electro-magnet coil M', out to brass plate $s$, to the shaft $a$, Fig. 1, to revolving brush B, to stationary commutator segment 1 by wire $w'$, to stationary electro-magnet coil F', and out to the other pole of the battery $b$. In this way the armature will be moved one-twentieth part of one revolution and the brushes will be placed in contact with, for example, the commutator-segments 2 and 2, Fig. 11, and the two pole-pieces $p$ $p'$, at each end of the electro-magnets F' and M', opposite each other. Now the current enters at commutator segment 2, passes to electro-magnet coil $M^2$, to brass plate $s$, where one end of each revolving coil is connected in multiple arc,) to the shaft $a$, to revolving brush B, to stationary commutator-segment 2 by wire $w'$, through the coil of stationary electro-magnet $F^2$, and out to the other pole of the battery $b$. Thus the armature will be moved another one-twentieth part of its revolution, and the next movement will be effected by the polarization of electro-magnets $F^3 M^3$, and so on, as shown in Fig. 11, with $F^4 M^4$, $F^5 M'$, $F' M^2$, $F^2 M^3$, $F^3 M^4$, $F^4 M'$, $F^5 M^2$, $F' M^3$, $F^2 M^4$, $F^3 M'$, $F^4 M^2$, $F^5 M^3$, $F' M^4$, $F^2 M'$, $F^3 M^2$, $F^4 M^3$, and $F^5 M^4$, making, therefore, twenty separate polarizations or magnetic circuits in one revolution, thus obtaining power from electricity in the most economical manner known, as the motor when so organized receives the whole current only through two electro-magnets at a time out of the nine composing the machine, thereby consuming a greater or less amount of the current, according to the power the motor exerts or to the speed at which it is running with a given electro-motive force.

The machine can also be used as a motor when only the fixed electro-magnets are acted upon by the current, the revolving electro-magnets serving then as a soft-iron armature, or vice versa. The revolving electro magnets may be polarized and the fixed not; but this manner of operating the motor is not economical unless it is desired to vary the power of the motor. The power of the motor may be varied in different ways—by introducing a rheostat in the circuit, as shown at R in Fig. 1, or a number of cells may be thrown in and out of circuit by switches in any well-known manner.

In Fig. 9 is shown in diagram a combination of seven fixed and four revolving electro-magnets. It will be noticed that while the numbers of the revolving commutator-segments are continuous up to the number of the revolving electro-magnets, the numbers of the stationary commutator-segments are not continuous—i. e., they pass every next one, 1 3 5 7 2 4 6 1, and so on, as shown in section at Fig. 6. When the pole-pieces 1 and 1 have made a "make," the next will be 3 and 2, the next after 5 and 3, and so on until twenty-eight magnetic makes will be made during one revolution of the armature.

Figs. 7 and 10 represent another combination, in which the revolving armature is composed of only three electro-magnets. In this case, while the polarization of the electro-magnets is in the same direction, the rotating motion of the armature is in the opposite direction—e. g., when 1 and 1 have made a make 2 and 2 will be the next, so that while the polarization is against the hands of a watch the armature moves in the same direction of the hands of a watch, or both operations vice versa.

In Figs. 9, 10, and 11 is shown one end of each coil of the fixed electro-magnets connected in multiple arc, and also one end of each coil of the revolving electro-magnets connected by themselves in another common connection, and the other ends of each coil are divided and connected to several segments of their own commutator.

When the machine is to be used as an electrical generator, the battery $b$ is dispensed with and motion may be applied to it in well-known manner.

What I claim as my invention is—

In an electric motor or dynamo-machine, a series of stationary electro-magnets, a series of revolving electro-magnets, one having an uneven number and the other an even number, the two series being arranged concentrically and parallel with each other, a stationary commutator to the segments of which the coils of the fixed series are connected at one end, a common or multiple-arc connection for the other ends of the coils of said series, a revolving brush for said commutator, a revolving commutator to the segments of which the coils of the revolving series are connected at one end, a common connection for the other ends of the coils of said revolving series, and a stationary brush for said revolving commutator, whereby the current is directed through the coils of one stationary and one revolving electro-magnet and the said electro-magnets form a closed magnetic circuit, this action taking place in proper sequence, so that each stationary electro-magnet makes a close magnetic circuit with each revolving electro-magnet once during each revolution.

ORAZIO LUGO.

Witnesses:
A. K. PARRIS,
AUG. CRANE, 2d.